US010906790B2

(12) United States Patent
Gilbride et al.

(10) Patent No.: US 10,906,790 B2
(45) Date of Patent: Feb. 2, 2021

(54) CONTROL BOX AND OPERATOR INTERFACE FOR AN INDUSTRIAL VEHICLE

(71) Applicant: JLG Industries, Inc., McConnellsburg, PA (US)

(72) Inventors: Matthew I. Gilbride, Frederick, MD (US); Ignacy Puszkiewicz, Hagerstown, MD (US); Brian K. Mohlman, Hagerstown, MD (US); David W. Lombardo, Walkersville, MD (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 0 days.

(21) Appl. No.: 16/321,495

(22) PCT Filed: Apr. 7, 2017

(86) PCT No.: PCT/US2017/026560
§ 371 (c)(1),
(2) Date: Jan. 29, 2019

(87) PCT Pub. No.: WO2017/177113
PCT Pub. Date: Oct. 12, 2017

(65) Prior Publication Data

US 2019/0177140 A1 Jun. 13, 2019

Related U.S. Application Data

(60) Provisional application No. 62/319,608, filed on Apr. 7, 2016.

(51) Int. Cl.
*G06F 3/033* (2013.01)
*B66F 9/075* (2006.01)
(Continued)

(52) U.S. Cl.
CPC .............. *B66F 9/0759* (2013.01); *B66F 9/20* (2013.01); *B66F 11/04* (2013.01); *B66F 11/044* (2013.01);
(Continued)

(58) Field of Classification Search
CPC ............ G06F 3/02–027; G06F 3/0338; G05G 1/00–62; G05G 9/00–10; G05G 1/06;
(Continued)

(56) References Cited

U.S. PATENT DOCUMENTS 6,148,593 A 11/2000 Heinsey et al.
2004/0011154 A1 1/2004 Dybro
(Continued)

FOREIGN PATENT DOCUMENTS

CN 103380075 A 10/2013
CN 104869909 A 8/2015
(Continued)

OTHER PUBLICATIONS

International Search Report dated Jun. 20, 2017 issued in PCT International Patent Application No. PCT/US2017/026560, 1 page.
(Continued)

*Primary Examiner* — Amr A Awad
*Assistant Examiner* — Aaron Midkiff
(74) *Attorney, Agent, or Firm* — Nixon & Vanderhye P.C.

(57) ABSTRACT

A control box and operator interface for an industrial vehicle includes a left thumb joystick controller, a right thumb joystick controller, and integrated handles positioned adjacent the left thumb joystick controller and the right thumb
(Continued)

joystick controller, respectively. The integrated handles are ergonomically positioned relative to the left and right thumb joystick controllers such that when an operator grasps the handles, the operator's thumbs are naturally positioned adjacent the left and right thumb joystick controllers, respectively. An enabling mechanism is associated with each of the integrated handles and includes a switch that serves to activate operational functionality of the left and right thumb joystick controllers.

13 Claims, 9 Drawing Sheets

(51) Int. Cl.
*B66F 9/20* (2006.01)
*B66F 17/00* (2006.01)
*B66F 11/04* (2006.01)
*G05G 1/04* (2006.01)

(52) U.S. Cl.
CPC ............ *B66F 11/046* (2013.01); *B66F 17/00* (2013.01); *B66F 17/006* (2013.01); *G05G 1/04* (2013.01)

(58) Field of Classification Search
CPC .. G05G 1/58; G05G 1/62; G05G 1/04; G05G 2009/04703–04781; H01H 3/022; B25J 13/00–089; B66F 9/0759; B66F 9/20–24; B66F 11/044; B66F 11/046; B66F 17/006
USPC .......................................................... 345/161
See application file for complete search history.

(56) References Cited

U.S. PATENT DOCUMENTS

| | | | | |
|---|---|---|---|---|
| 2005/0179532 | A1 | 8/2005 | Nagai et al. | |
| 2008/0255704 | A1* | 10/2008 | Braut | B25J 19/06 700/264 |
| 2010/0320022 | A1 | 12/2010 | Kias et al. | |
| 2013/0233645 | A1* | 9/2013 | Hao | B66F 17/006 182/19 |
| 2015/0342562 | A1 | 12/2015 | Messina et al. | |
| 2016/0075543 | A1 | 3/2016 | Lombardo et al. | |

FOREIGN PATENT DOCUMENTS

| | | |
|---|---|---|
| EP | 1775254 | 4/2007 |
| JP | H05-124800 | 5/1993 |
| JP | 2001-122150 | 5/2001 |
| JP | 2003-012294 | 1/2003 |
| JP | 2007-168067 | 7/2007 |
| JP | 2007-195490 | 8/2007 |
| JP | 2011-063352 | 3/2011 |
| JP | 2012-187953 | 10/2012 |

OTHER PUBLICATIONS

International Preliminary Report on Patentability dated Apr. 24, 2018 issued in PCT International Patent Application No. PCT/US2017/026560, 21 pp.
Chinese Office Action dated Aug. 27, 2019 issued in Chinese Patent Application No. 201780021697.2, 12 pp.
Japanese Decision to Grant dated Jan. 7, 2020 issued in Japanese Patent Application No. 2018-552041, 6 pp.

* cited by examiner

CONTROL BOX AND OPERATOR INTERFACE FOR AN INDUSTRIAL VEHICLE

CROSS-REFERENCES TO RELATED APPLICATIONS

This application is the U.S. national phase of International Application No. PCT/US2017/026560 filed Apr. 7, 2017 which designated the U.S. and claims priority to U.S. Provisional Patent Application No. 62/319,608 filed Apr. 7, 2016, the entire contents of each of which are hereby incorporated by reference.

STATEMENT REGARDING FEDERALLY SPONSORED RESEARCH OR DEVELOPMENT (NOT APPLICABLE)

BACKGROUND

The invention relates to control box design and operator interface architecture applicable for industrial vehicles such as aerial work platforms (AWP), especially boom lifts.

The invention addresses several problems related to the traditional box layout. Existing layouts are prone to inadvertent operation of the controllers by an operator leaning against a controller or a controller getting caught in an operator's coat or the like. Existing layouts have poor ergonomics. Additionally, it is common for operators to use the joystick to try to stabilize himself/herself, which negatively affects the quality of operation. Still further, decals explaining details of machine operation have typically been placed at angles that make it difficult to read, etc. Customers/users of AWPs may also want improved, proportional controls of the secondary functions (like telescope, jib, lower boom (tower)). With current designs, these controls require additional large joysticks and unique layouts of the controls.

BRIEF SUMMARY

With reference to the drawings, the described embodiments provide the various advantages over traditional designs. Exemplary advantages include guarded location of the main control joysticks, grab handles integrated with enabling mechanisms and joysticks, open center design for improved visibility for various height operators, integrated display surface for graphical information, integrated tool storage, guarded, ergonomic placement of secondary joysticks, ability to integrate displays of various sizes and functionality, and more. The proposed concept provides new placement of mini-joysticks for secondary functions and allows the use of switches (on-off operation) or proportional mini-joysticks while maintaining a familiar layout. Drive and steer control may be realized by a single thumb joystick with the joystick and thus wheels returning to center after the joystick is released. The described embodiments provide new features and improvements but retain the traditional grouping of controls known from existing machines, thus allowing for easy transition to the improved designs.

In an exemplary embodiment, a control box and operator interface for an industrial vehicle includes a left thumb joystick controller, a right thumb joystick controller, and integrated handles positioned adjacent the left thumb joystick controller and the right thumb joystick controller, respectively. The integrated handles are ergonomically positioned relative to the left and right thumb joystick controllers such that when an operator grasps the handles, the operator's thumbs are naturally positioned adjacent the left and right thumb joystick controllers, respectively. An enabling mechanism is associated with each of the integrated handles and includes a switch that serves to activate operational functionality of the left and right thumb joystick controllers and/or other control box functions. Enabling mechanisms may replace a footswitch and may or may not be associated directly with their respective thumb joysticks.

The control box may include an outer periphery surrounding a center opening, where the left and right thumb joystick controllers are positioned in upper left and upper right portions of the outer periphery, respectively. Secondary function switches may be disposed in the outer periphery. In some embodiments, the secondary function switches are guarded on an operator side of the secondary function switches. A left hand-grip joystick controller and a right hand-grip joystick controller may extend from a lower portion of the outer periphery into the center opening. A display screen may be positioned in the center opening.

In some embodiments, the industrial vehicle is an aerial work platform, where the left thumb joystick controller is associated with one of (1) lift and swing, and (2) drive and steer, and where the right thumb joystick controller is associated with the other of (1) lift and swing, and (2) drive and steer.

Ranging sensors may be provided that detect at least one of operator and object proximity to the control box.

In another exemplary embodiment, a work platform for an industrial vehicle includes a platform railing including a control box area, and a control box and operator interface secured to the platform railing in the control box area. The control box and operator interface includes a left thumb joystick controller, a right thumb joystick controller, and integrated handles positioned adjacent the left thumb joystick controller and the right thumb joystick controller, respectively. The integrated handles are ergonomically positioned relative to the left and right thumb joystick controllers such that when an operator grasps the handles, the operator's thumbs are naturally positioned adjacent the left and right thumb joystick controllers, respectively. An enabling mechanism is associated with each of the integrated handles and includes a switch that serves to activate operational functionality of the left and right thumb joystick controllers and/or other control box functions. Enabling mechanisms may replace a footswitch and may or may not be associated directly with their respective thumb joysticks.

A position of the control box in the control box area may be adjustable relative to the platform railing. In this context, an outer upper end of the control box may be pivotally secured on a pivot axis to the platform railing. A height adjusting link may be secured between an outer lower end of the control box and a floor of the work platform.

The work platform may additionally include an IR sensor beam kit secured to the platform railing on opposite sides of the control box.

The control box may include an outer periphery surrounding a center opening, where the left and right thumb joystick controllers are positioned in upper left and upper right portions of the outer periphery, respectively. Secondary function switches may be disposed in the outer periphery.

BRIEF DESCRIPTION OF THE DRAWINGS

These and other aspects and advantages will be described in detail with reference to the accompanying drawings, in which.

DETAILED DESCRIPTION

Figure 1:
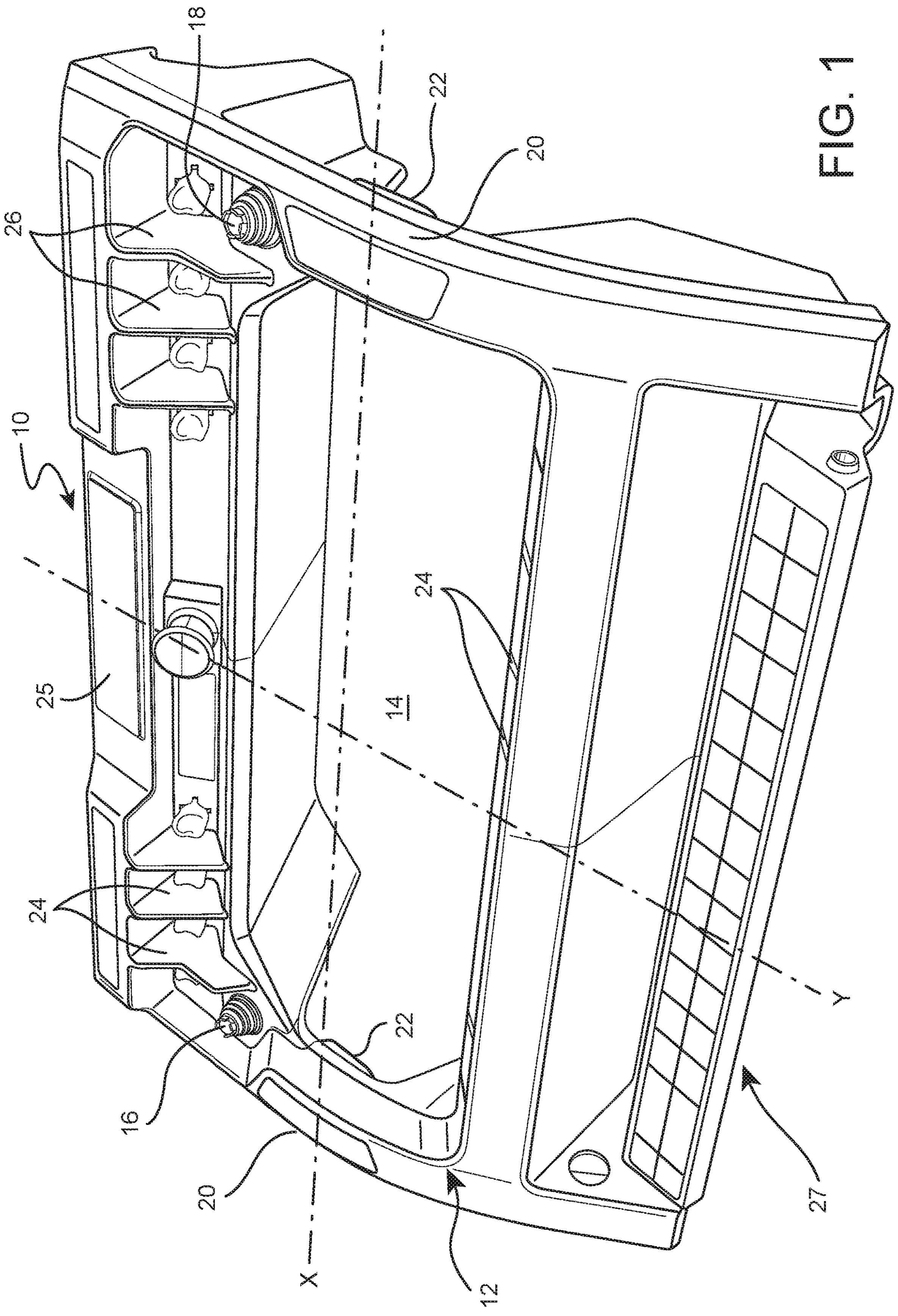
FIG. 1 is a perspective view of the control box and operator interface for an industrial vehicle of the described embodiments.

FIG. 1 shows a perspective view of an exemplary control box and operator interface 10 (hereinafter "control box"). The control box 10 will be described with reference to its application to an aerial work platform (AWP), particularly boom lifts. The control box, however, is not meant to be limited to the described application and may be suitably adapted for use with alternative industrial vehicles.

The control box 10 is generally provided with an overall outer periphery 12 surrounding a center opening 14. The open design of the center improves visibility for various height operators. The control box 10 is preferably constructed of a lightweight plastic material and may be assembled using molded parts. Alternative lightweight materials may also be used for the control box. For ease of reference, the control box 10 and the outer periphery 12 can be conceptually divided into upper and lower portions (above and below line X in FIG. 1, respectively) and left and right portions (left and right of line Y in FIG. 1, respectively).

The control box 10 includes a left thumb joystick controller 16 and a right thumb joystick controller 18. Integrated handles 20 are positioned adjacent the left thumb joystick controller 16 and the right thumb joystick controller 18, respectively. The integrated handles 20 are ergonomically positioned relative to the left and right thumb joystick controllers 16, 18 such that when an operator grasps the handles 20, the operator's thumbs are naturally positioned adjacent the left and right thumb joystick controllers 16, 18, respectively. The operator can use the integrated handles 20 for support during use and operation of the vehicle. In the exemplary application to aerial work platforms, the left thumb joystick controller 16 may be associated with lift and swing functions of the boom, and the right thumb joystick controller 18 may be associated with drive and steer functions of the vehicle. Of course, this functionality could be reversed. With the thumb joystick controllers 16, 18, drive and steer control can be realized with a single joystick controller. In some embodiments, the thumb joystick controllers 16, 18 are biased to return to center when released. As such, when the thumb joystick controller associated with drive and steer control is released, the vehicle is stopped, and the wheels return to center, i.e., a straight orientation.

An enabling mechanism 22 is associated with each of the integrated handles 20. In some embodiments, the enabling mechanism comprises a switch that serves to activate operational functionality of the left and right thumb joystick controllers 16, 18. The switches can be mechanical, membrane, capacitance or the like and may include biometric identification such as fingerprint recognition. The enabling mechanisms 22 help to prevent inadvertent operation of the machinery, e.g., when the operator is not holding the handles.

With continued reference to FIG. 1, the left 16 and right 18 thumb joystick controllers are generally positioned in upper left and upper right portions of the outer periphery 12, respectively. A plurality of secondary function switches 24 may also be disposed in the outer periphery 12. Exemplary secondary function switches 24 control various features of the machine, and in the context of an aerial work platform, may serve to activate boom and/or jib functions. Other uses of the secondary function switches may include, for example, activating travel speed settings, turntable orientation acknowledgement, engine start stop, auxiliary power, various alarm and sensor system overrides, steering mode selection, fuel/power selection, horn, platform level, and the like. At least some of the secondary function switches 24 include switch guards 26 and others may be oriented to face away from the operator to avoid inadvertent operation or operator confusion.

The outer periphery 12 may also include an indicator panel 25 showing machine status of several machine operating characteristics. Exemplary indications may include, for example, boom control system indicator, over moment warning, tilt warning, foot switch indicator, machine enabled indicator, creep indicator, glow plug indicator, system distress indicator, broken cable indicator, service rope indicator, platform capacity mode indicator, platform overload indicator, jib locked indicator, soft touch override indicator, SkyGuard™ indicator, fuel level indicator, drive orientation indicator, LSS warning, generator on indicator, axels deployed/locked indicator, crawler drive locked indicator, and the like. The box architecture may also provide an integrated display surface 27 for graphical information and/or integrated tool storage. The integrated display surface is positioned so that the information decals are easy to read by an operator, and the operator can immediately determine meanings of machine status information presented on the indicator panel 25.

Figure 2:
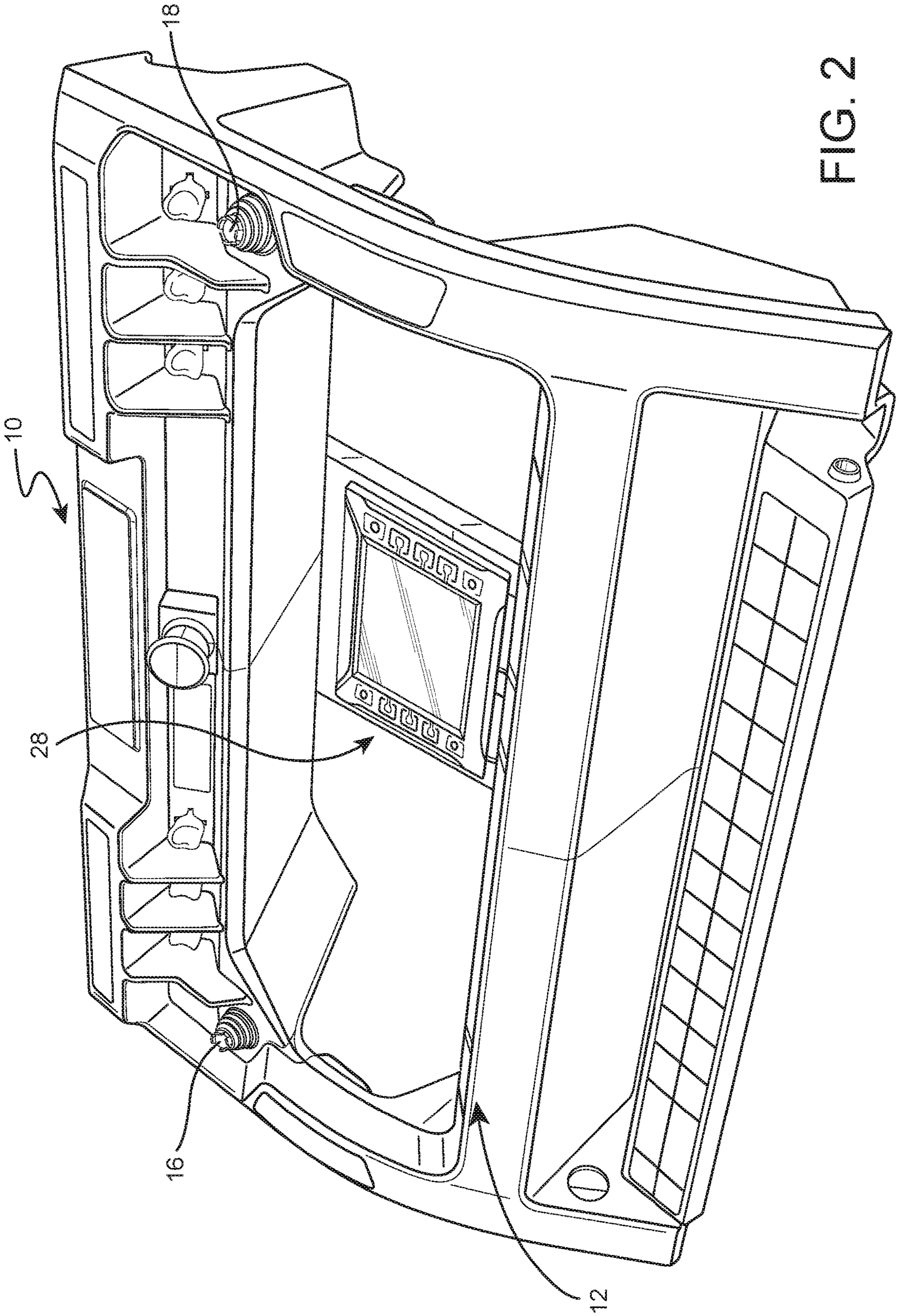
FIG. 2 shows an exemplary control box secured on a work platform.

With reference to FIG. 2, a display screen 28 may be positioned in the center opening 14. The display screen 28 may be configured for displaying, for example, system diagnostics and analyzer output, various sensor systems output and visualizations, boom position indicator, system notifications and warnings, camera feeds, and the like.

Figure 3:
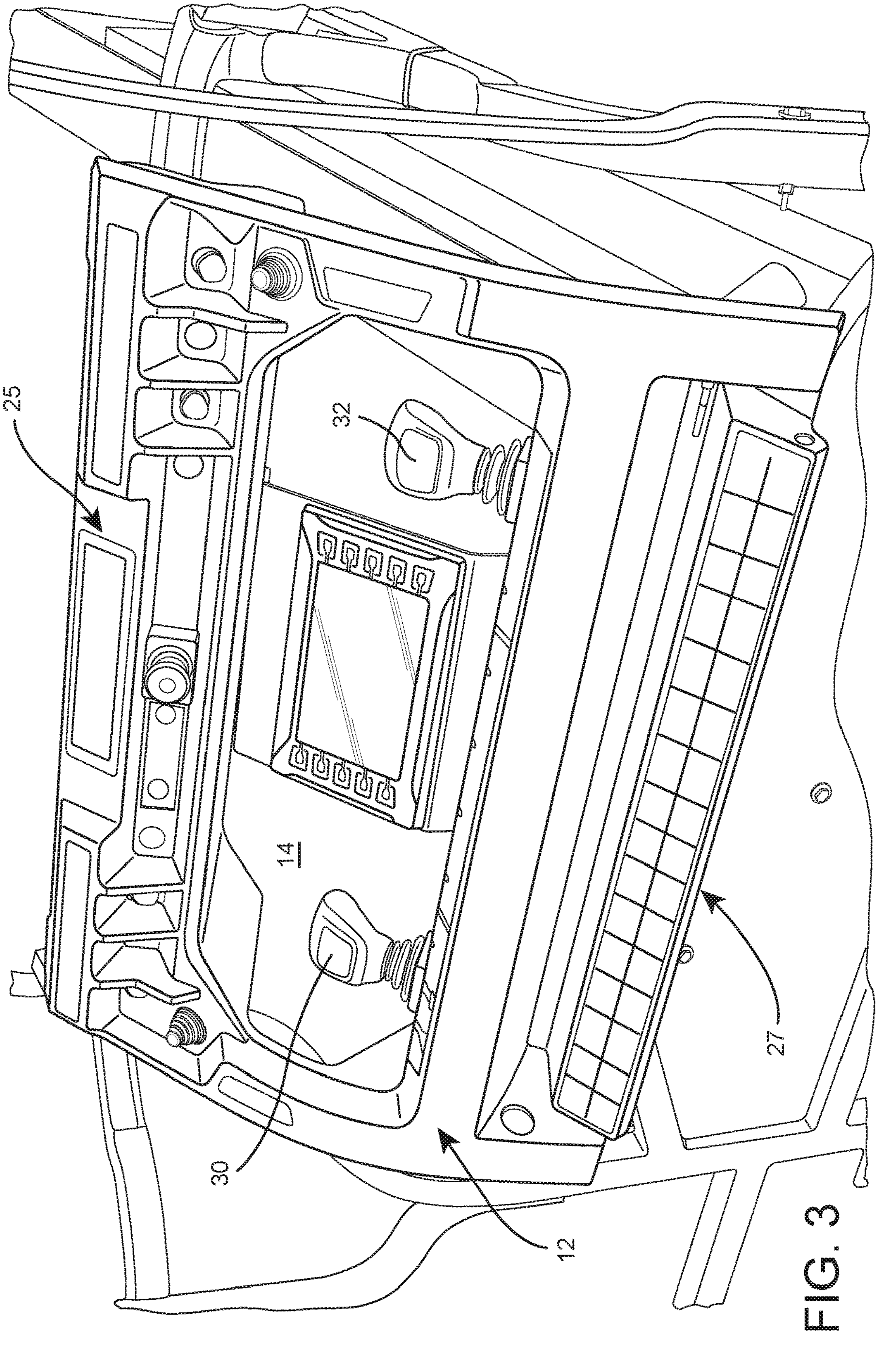
FIG. 3 shows an alternative exemplary control box incorporating traditional hand-grip joysticks.

FIG. 3 shows a variation of the control box including a left hand-grip joystick controller 30 and a right hand-grip joystick controller 32 extending from a lower portion of the outer periphery 12 into the center opening 14. The hand-grip joysticks 30, 32 provide a user option for more traditional control for primary functions of the machine. In an exemplary construction, the left hand-grip joystick 30 is associated with lift and swing functions, while the right hand-grip joystick 32 is associated with drive and steer functions.

Figure 4:
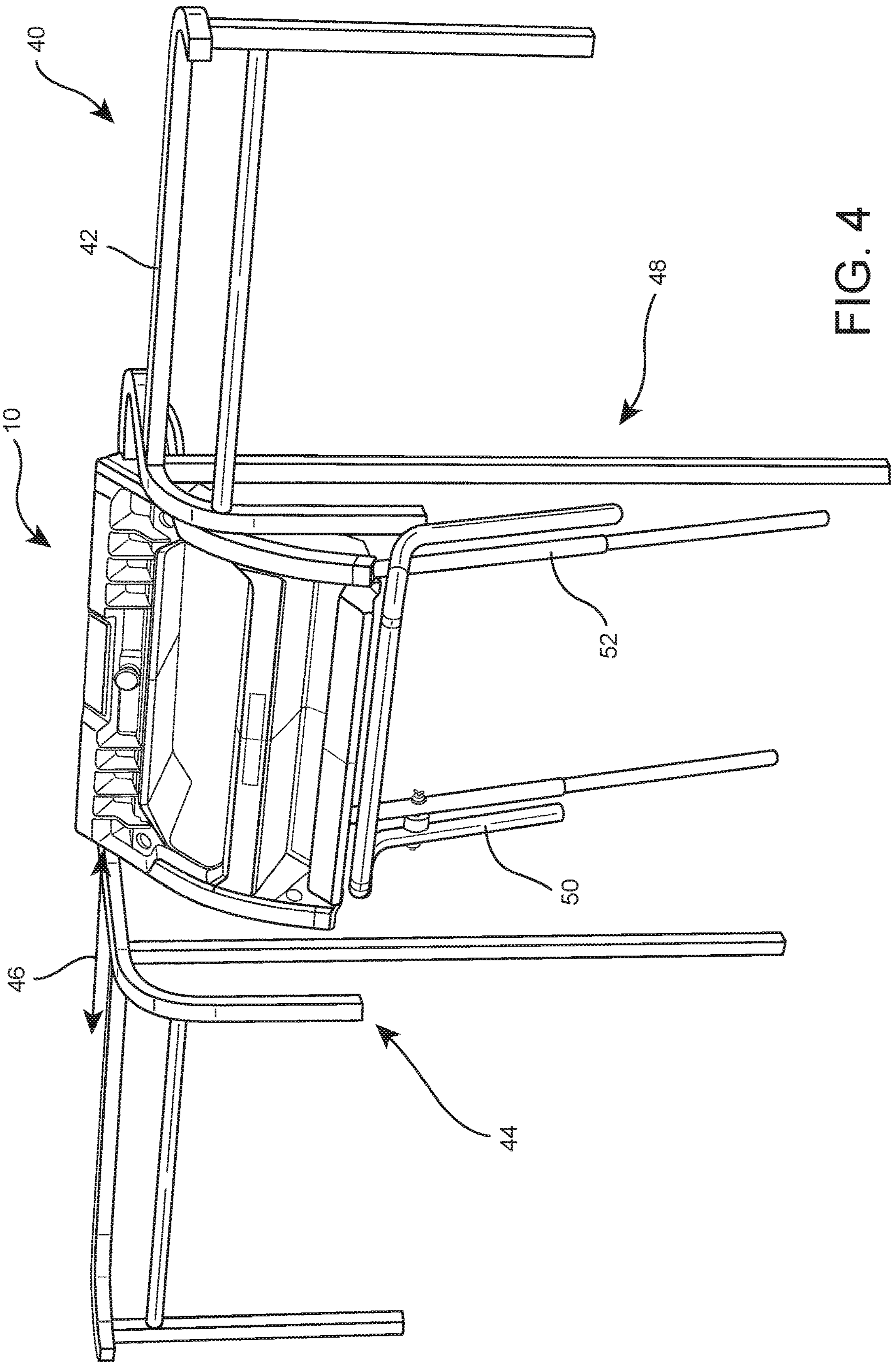
FIGS. 4 and 5 show adjustable mounting arrangements for the control box.
Figure 5:
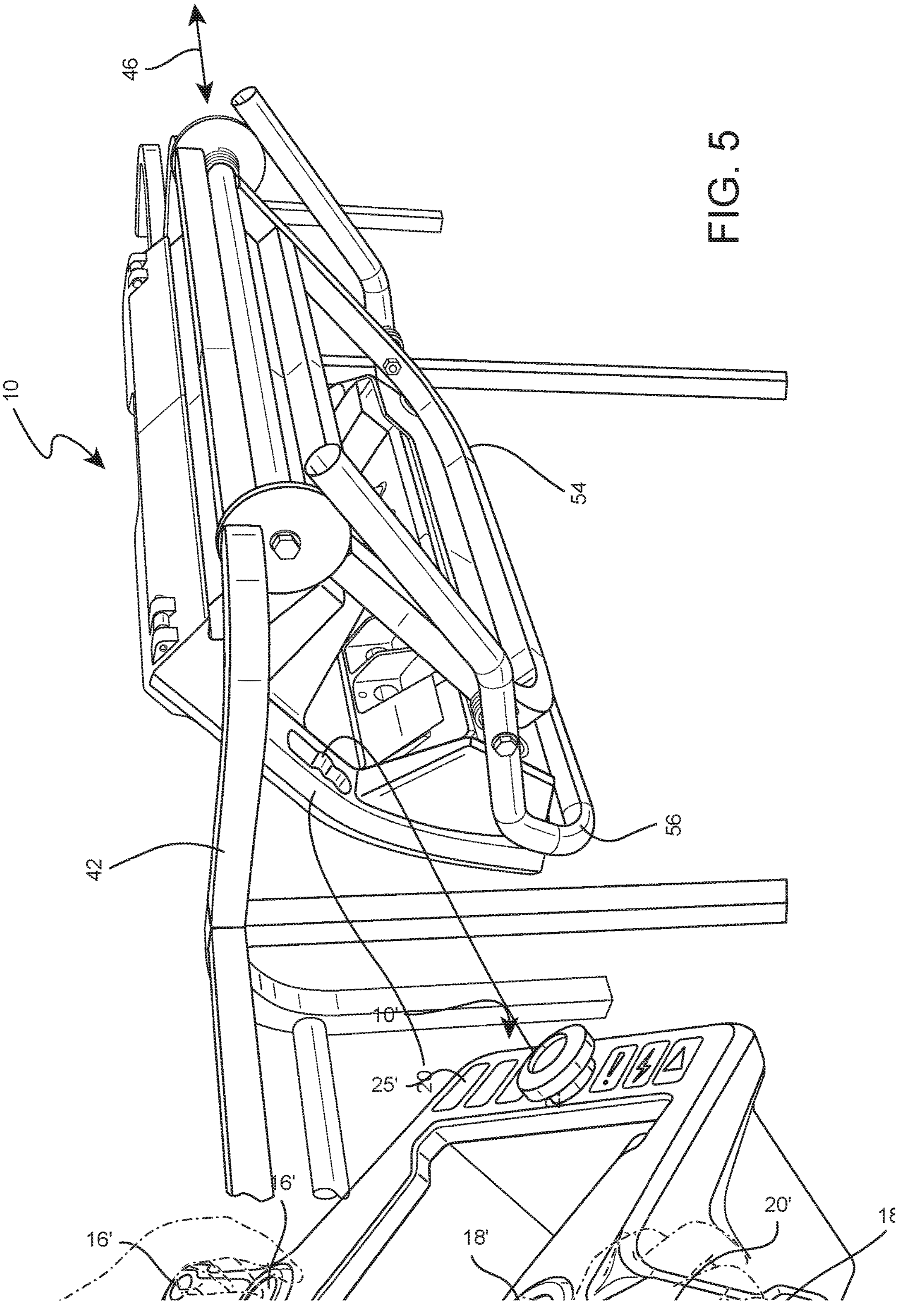

FIGS. 4 and 5 show the control box 10 mounted on an aerial work platform 40. The platform 40 includes a platform railing 42 with a control box area 44. The control box 10 is secured to the platform railing 42 in the control box area 44. In some embodiments, a position of the control box 10 in the control box area 44 is adjustable relative to the platform railing 42. In the exemplary construction shown in FIG. 4, an outer upper end of the control box 10 is pivotally secured on a pivot axis 46 to the platform railing 42. The platform 40 may be provided with a height adjusting link 48 that is secured between an outer lower end of the control box 10 and a floor of the work platform 40. In an exemplary construction of the height adjusting link 48, a spring-biased release bar 50 is cooperable with a telescoping leg assembly 52. The release bar 50 is biased toward a locked position. When the release bar 50 is squeezed against the control box 10, the lock with the telescoping leg assembly is released, and the control box 10 is slideably adjustable on the telescoping support rails 52. The control box 10 pivots on the pivot axis 46 to adjust a height/position of the control box 10 relative to the platform railing 42.

In FIG. 5, the control box 10 is secured to the railing 42 via a cantilevered frame 54. A release rail 56 releases a lock to enable the box 10 to pivot on the pivot axis 46 at the outer upper end of the control box 10 as shown. The cantilevered frame 54 adds strength and aids in adjustability. The adjustable position of the control box accommodates operators of varying heights.

Figure 6:
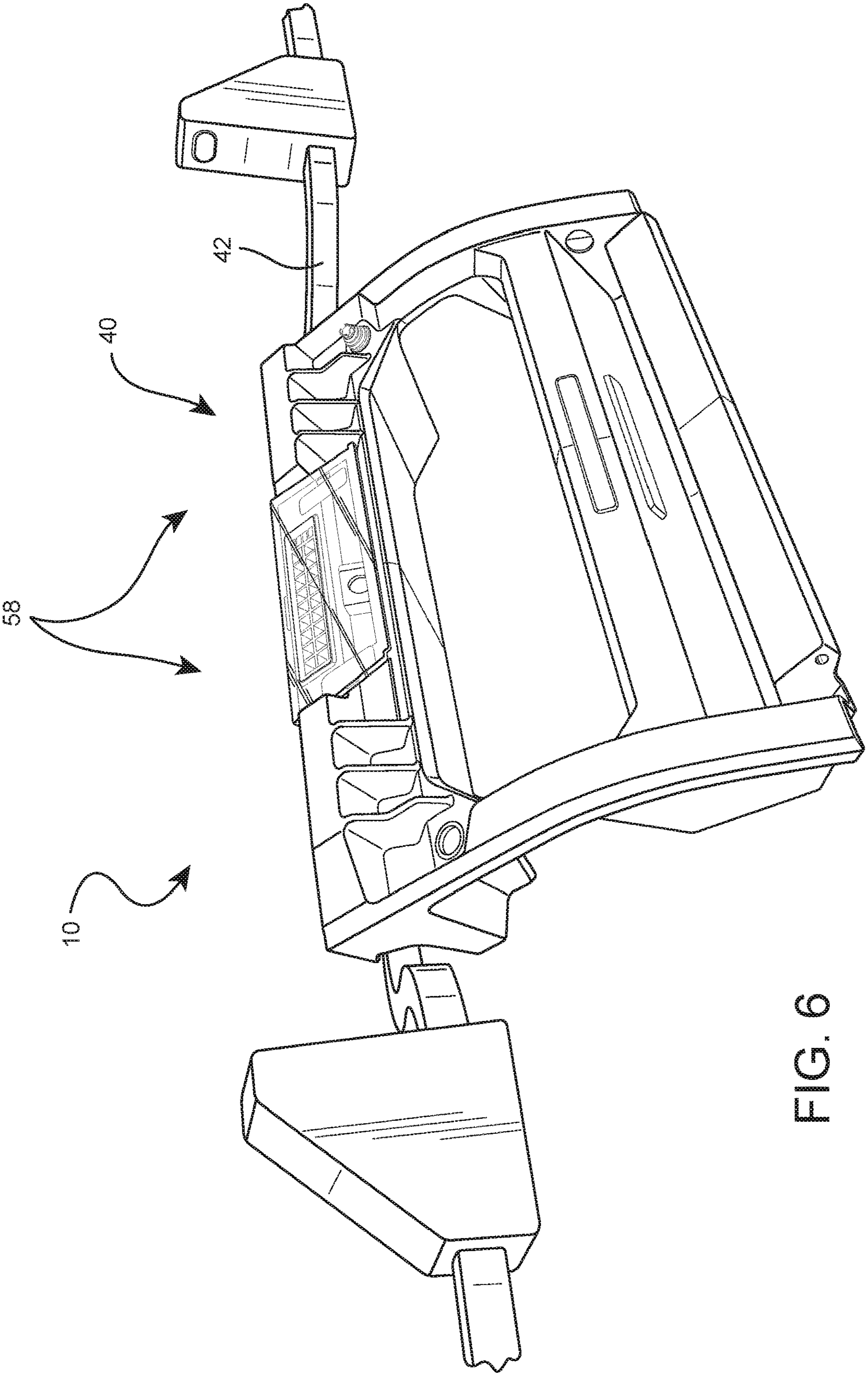
FIG. 6 is an exemplary configuration of the control box including an IR sensor beam kit for operator safety.

FIG. 6 shows the control box 10 and work platform 40 including an IR sensor beam kit 58 secured to the platform railing 42 on opposite sides of the control box 10. The IR sensor beam kit 58 can detect when an operator may be pressed into the control panel by an overhead obstacle or the like. The control system may be programmed such that when the beam between the sensors is broken, machine operation can be stopped or reversed or otherwise manipulated to avoid/eliminate the crushing hazard.

Figure 7:
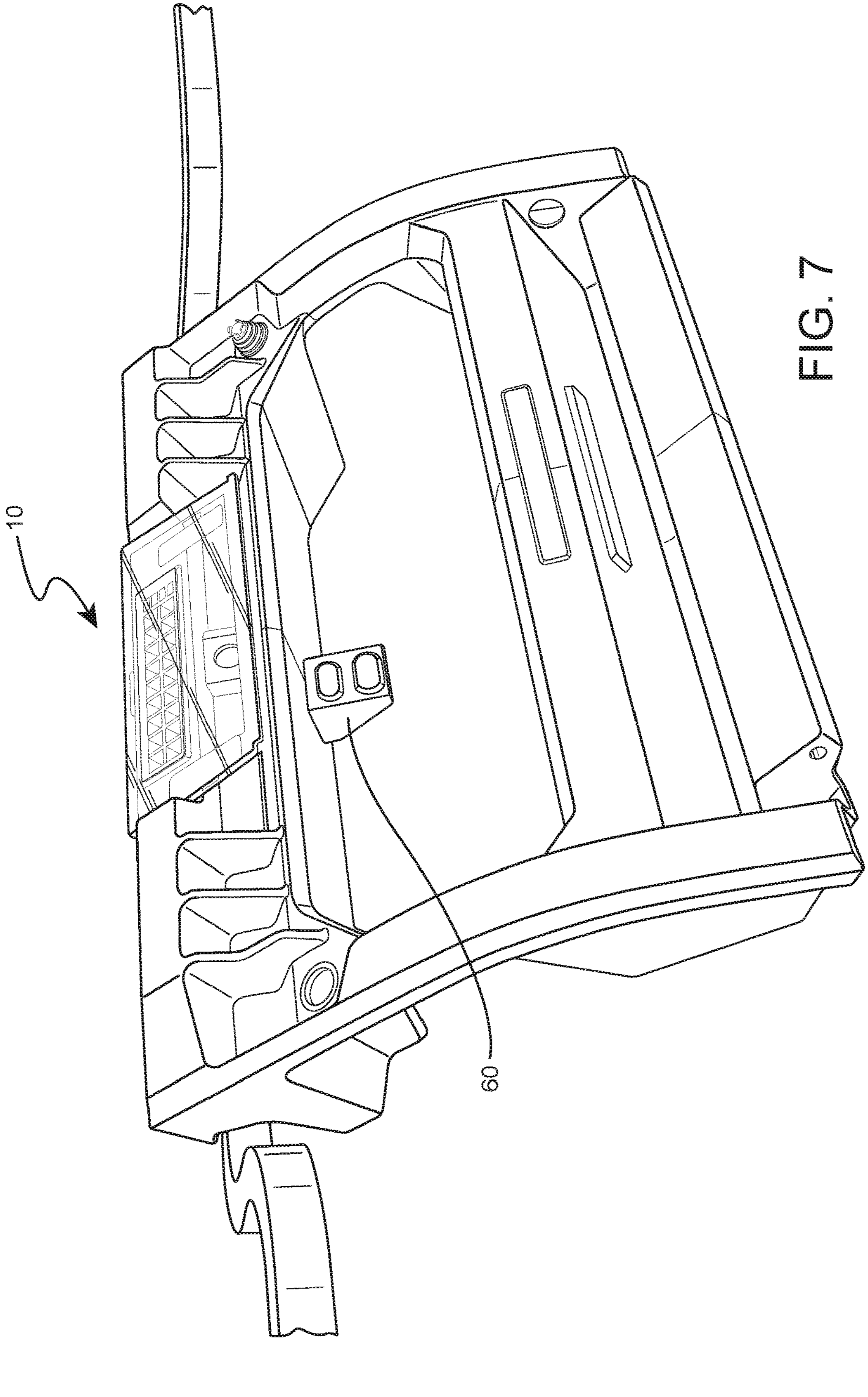
FIGS. 7 and 8 show exemplary features incorporated into the control box for operator safety and collision avoidance.
Figure 8:
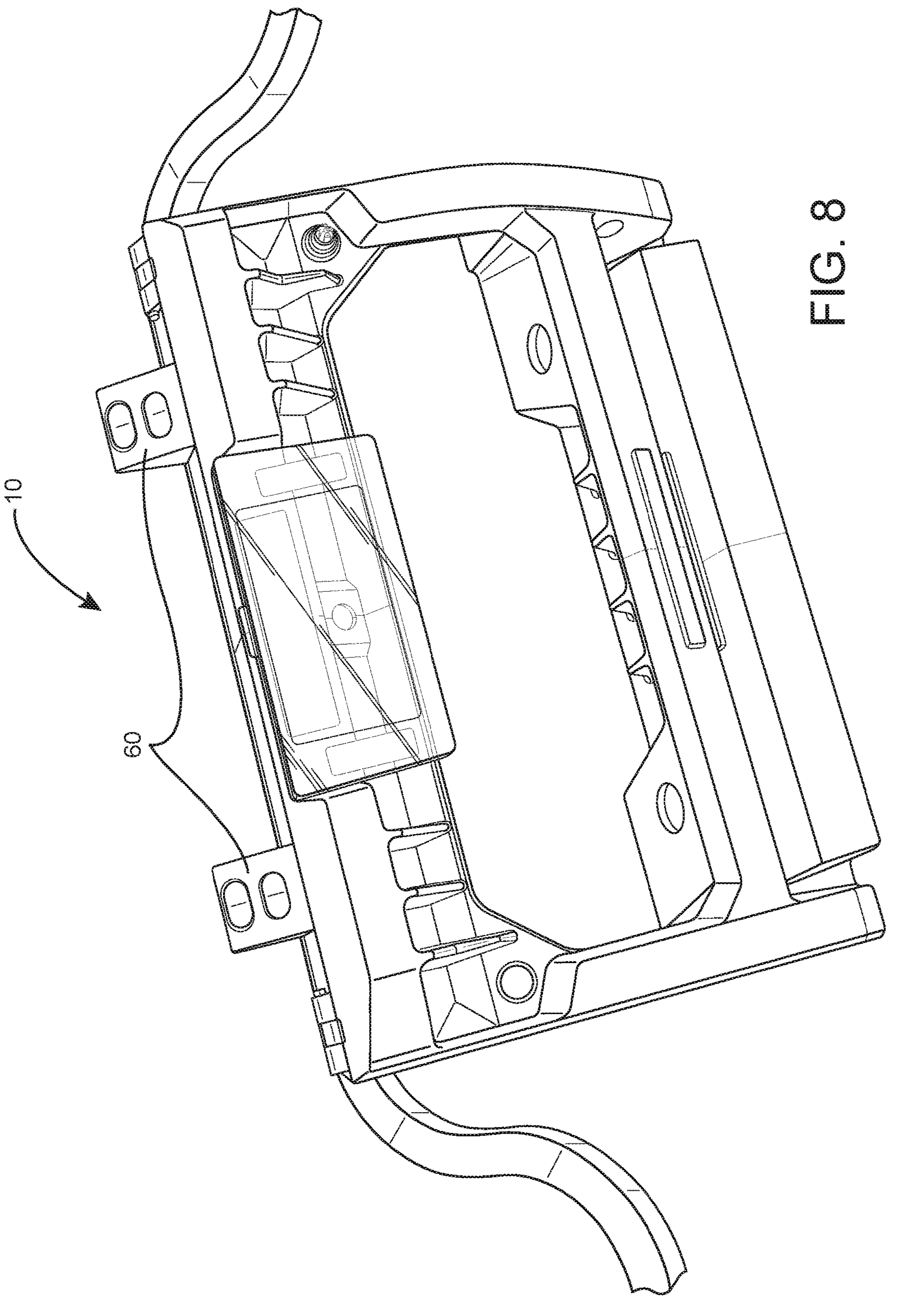

FIGS. 7 and 8 show a variation of the control box 10 including ranging sensors 60 that detect either operator or object proximity to the control box 10. The sensors 60 cam detect the proximity of an object that could pose an impact hazard to the platform or a potential crushing hazard for an operator. The ranging sensors 60 may be housed within sensor bays as depicted in FIGS. 7 and 8 or may be integrated directly into the internal electronics of the control box itself. The ranging sensors 60 may use technologies including, IR ranging sensors, LIDAR, Radar, and the like.

Figure 9:
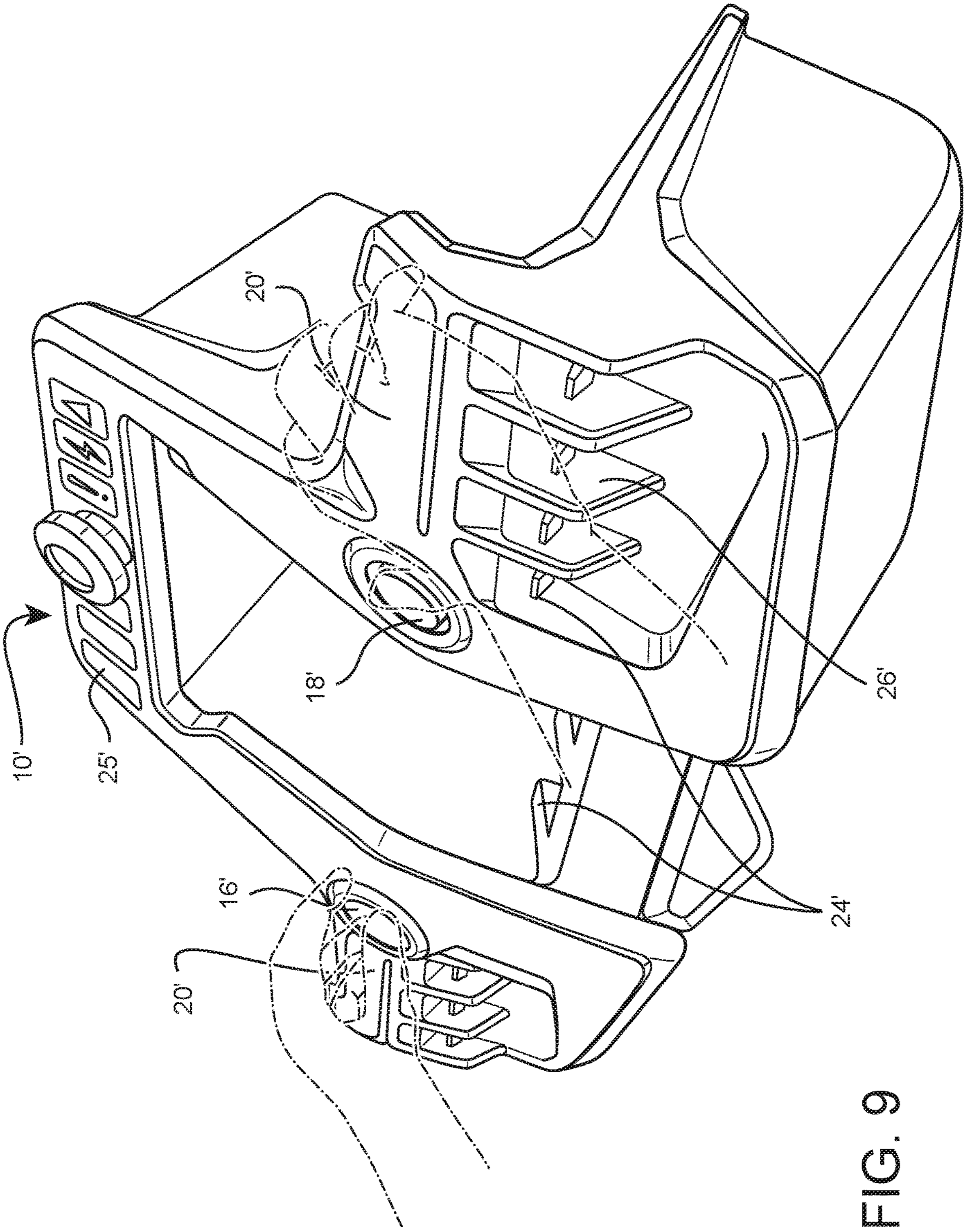
FIG. 9 shows an alternative design for the control box of the described embodiments.

FIG. 9 is an exemplary alternative configuration for the control box 10'. The alternative configuration similarly incorporates integrated grips 20' associated with left and right thumb joystick controllers 16', 18', function switches 24' that may face away from the operator, an indicator panel 25', switch guards 26', etc.

The control box and operator interface of the described embodiments provides cost and weight savings compared to current designs, potentially allowing for a smaller counterweight and/or increased platform capacity. Additionally, the integrated handles provide for operator stabilization during use and enable operation of the main machine functions using thumb joystick controllers. The control box can affect vehicle control and operation without a traditional foot switch as functions are enabled by switches built into the integrated handles. The ergonomic design results in a more comfortable and positive operator experience.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A control box and operator interface for an industrial vehicle, the control box and operator interface comprising:
- an outer periphery surrounding a center opening, the center opening providing a line of sight through the control box;
- a left thumb joystick controller configured for operation by an operator's left thumb positioned in a left portion of the outer periphery;
- a right thumb joystick controller configured for operation by the operator's right thumb positioned in a right portion of the outer periphery;
- integrated handles positioned adjacent the left thumb joystick controller and the right thumb joystick controller, respectively, the integrated handles being ergonomically positioned relative to the left and right thumb joystick controllers such that when an operator grasps the handles, the operator's thumbs are naturally positioned adjacent the left and right thumb joystick controllers, respectively, wherein the left and right portions of the outer periphery in which the left and right thumb joystick controllers are respectively positioned are recessed relative to the integrated handles; and
- an enabling mechanism associated with each of the integrated handles, the enabling mechanism comprising a switch that serves to activate operational functionality of the left and right thumb joystick controllers, wherein the switch is positioned on a side of the outer periphery opposite from the left and right thumb joystick controllers.

2. A control box according to claim 1, further comprising secondary function switches disposed in the outer periphery.

3. A control box according to claim 2, wherein the secondary function switches are guarded on an operator side of the secondary function switches.

4. A control box according to claim 1, further comprising a left hand-grip joystick controller and a right hand-grip joystick controller, the left and right hand-grip joystick controllers extending from a lower portion of the outer periphery into the center opening of the outer periphery.

5. A control box according to claim 1, further comprising a display screen positioned in the center opening.

6. A control box according to claim 1, wherein the industrial vehicle is an aerial work platform, wherein the left thumb joystick controller is associated with one of (1) lift and swing, and (2) drive and steer, and wherein the right thumb joystick controller is associated with the other of (1) lift and swing, and (2) drive and steer.

7. A control box according to claim 1, further comprising ranging sensors that detect at least one of operator and object proximity to the control box.

8. A work platform for an industrial vehicle, the work platform comprising:
- a platform railing including a control box area; and
- a control box and operator interface secured to the platform railing in the control box area, the control box and operator interface comprising:
  - an outer periphery surrounding a center opening, the center opening providing a line of sight through the control box;
  - a left thumb joystick controller configured for operation by an operator's left thumb positioned in a left portion of the outer periphery,
  - a right thumb joystick controller configured for operation by the operator's right thumb positioned in a right portion of the outer periphery, integrated handles positioned adjacent the left thumb joystick controller and the right thumb joystick controller, respectively, the integrated handles being ergonomically positioned relative to the left and right thumb joystick controllers such that when an operator grasps the handles, the operator's thumbs are naturally positioned adjacent the left and right thumb joystick controllers, respectively, wherein the left and right portions of the outer periphery in which the left and right thumb joystick controllers are respectively positioned are recessed relative to the integrated handles, and an enabling mechanism associated with each of the integrated handles, the enabling mechanism comprising a switch that serves to activate operational functionality of the left and right thumb joystick controllers, wherein the switch is positioned on a side of the outer periphery opposite from the left and right thumb joystick controllers.

9. A work platform according to claim 8, wherein a position of the control box in the control box area is adjustable relative to the platform railing.

10. A work platform according to claim 9, wherein an outer upper end of the control box is pivotally secured on a pivot axis to the platform railing.

11. A work platform according to claim 10, wherein a height adjusting link is secured between an outer lower end of the control box and a floor of the work platform.

12. A work platform according to claim 8, further comprising an IR sensor beam kit secured to the platform railing on opposite sides of the control box.

13. A work platform according to claim 8, further comprising secondary function switches disposed in the outer periphery.

* * * * *